United States Patent
Buist, Sr.

(10) Patent No.: US 11,191,622 B2
(45) Date of Patent: Dec. 7, 2021

(54) METHOD AND APPARATUS FOR SURGICALLY PLACING A DENTAL IMPLANT

(71) Applicant: Charles Buist, DMD, PA, Hilton Head Island, SC (US)

(72) Inventor: Charles Buist, Sr., Irmo, SC (US)

(73) Assignee: Charles Buist, DMD, PA, Hilton Head Island, SC (US)

( * ) Notice: Subject to any disclaimer, the term of this patent is extended or adjusted under 35 U.S.C. 154(b) by 541 days.

(21) Appl. No.: 16/157,511

(22) Filed: Oct. 11, 2018

(65) Prior Publication Data

US 2019/0201168 A1 Jul. 4, 2019

Related U.S. Application Data

(63) Continuation-in-part of application No. 15/860,799, filed on Jan. 3, 2018, now Pat. No. 10,758,319, and a continuation-in-part of application No. 15/981,964, filed on May 17, 2018, now Pat. No. 10,631,895, and a continuation-in-part of application No. 29/659,801, filed on Aug. 13, 2018, now Pat. No. Des. 896,963, and a continuation-in-part of application No.
(Continued)

(51) Int. Cl.
*A61C 8/00* (2006.01)
*A61C 3/02* (2006.01)

(52) U.S. Cl.
CPC .............. *A61C 8/0089* (2013.01); *A61C 3/02* (2013.01)

(58) Field of Classification Search
CPC ........... A61C 8/0089; A61C 3/12; A61C 3/02; A61B 17/3211; A61B 17/1604; A61B 17/1637; A61B 17/16; A61B 17/1673; A61B 17/32
See application file for complete search history.

(56) References Cited

U.S. PATENT DOCUMENTS

| 233,486 A | 10/1880 | Donaldson |
| D108,719 S | 3/1938 | Morgan |

(Continued)

FOREIGN PATENT DOCUMENTS

| CH | 664279 A5 | 2/1988 |
| CN | 2478552 | 2/2002 |

(Continued)

*Primary Examiner* — Jacqueline T Johanas
*Assistant Examiner* — Shannel Nicole Belk
(74) *Attorney, Agent, or Firm* — Burr & Forman LLP; Hunter S. Freeman

(57) ABSTRACT

A method of placing a dental implant without the use of traditional tools such as a mallet or an electric drill to create the opening in the patient's jaw bone that will receive the dental implant is provided. This method may include the steps of creating an implant opening, incising the opening, refining the opening and inserting the dental implant in the opening. A piercing instrument may be used to create the opening, a first cutting tool may be used to incise the opening, a second cutting tool may be used to refine the opening and a hand operated driver may be used to insert the dental implant into the opening. In at least one embodiment, only a hand force is applied to the instruments used to carry out the method without the use additional instruments to create or augment the force being applied to the instruments being used.

20 Claims, 12 Drawing Sheets

Related U.S. Application Data

16/108,539, filed on Aug. 22, 2018, now Pat. No. 10,772,705.

(56) References Cited

U.S. PATENT DOCUMENTS

| | | | |
|---|---|---|---|
| 2,383,049 A * | 8/1945 | Elwell | A41F 11/04 |
| | | | 24/170 |
| 2,640,379 A | 6/1953 | Graves | |
| 2,838,049 A | 6/1958 | Eisenhofer | |
| 3,624,908 A | 12/1971 | Ricketts et al. | |
| 3,922,784 A | 12/1975 | Prince et al. | |
| D265,341 S | 7/1982 | Moore et al. | |
| 4,626,212 A * | 12/1986 | Mann | A61C 3/10 |
| | | | 433/144 |
| 4,728,330 A | 3/1988 | Comparetto | |
| 4,881,534 A * | 11/1989 | Uhl | A61B 17/1604 |
| | | | 606/84 |
| 4,976,617 A * | 12/1990 | Carchidi | A61C 8/0089 |
| | | | 433/141 |
| 5,188,531 A | 2/1993 | Von Sutfin | |
| D351,654 S | 10/1994 | Wauchope | |
| 5,481,949 A | 1/1996 | Yen | |
| 5,569,299 A | 10/1996 | Dill et al. | |
| 5,704,740 A | 1/1998 | Ebenhoch et al. | |
| 6,099,310 A | 8/2000 | Bornstein et al. | |
| 6,485,495 B1 * | 11/2002 | Jenkinson | A61B 17/1604 |
| | | | 606/167 |
| 6,685,472 B2 | 2/2004 | Kastenbaum | |
| 6,698,320 B2 | 3/2004 | Hu | |
| D551,764 S | 9/2007 | Easley | |
| 7,303,396 B2 | 12/2007 | Abarno | |
| D567,378 S | 4/2008 | Nordahl et al. | |
| D587,369 S | 2/2009 | Hickok | |
| D588,270 S | 3/2009 | Hickok | |
| D588,697 S | 3/2009 | Hickok | |
| D687,552 S | 8/2013 | Kile et al. | |
| D700,330 S | 2/2014 | Way et al. | |
| D730,519 S | 5/2015 | Arnett | |
| 9,079,255 B2 | 7/2015 | Jager et al. | |
| 9,198,743 B2 | 12/2015 | Wang | |
| 9,308,587 B2 | 4/2016 | Kitagawa et al. | |
| D761,963 S | 7/2016 | Way et al. | |
| 9,498,273 B2 | 11/2016 | Thoren et al. | |
| D775,338 S | 12/2016 | Gitman | |
| D827,823 S | 9/2018 | Larsen | |
| D875,247 S | 2/2020 | Tajbakhsh | |
| 2003/0143513 A1 * | 7/2003 | Flanagan | A61C 8/0089 |
| | | | 433/141 |
| 2009/0069834 A1 * | 3/2009 | Ohguchi | A61C 8/0089 |
| | | | 606/185 |
| 2009/0136898 A1 | 5/2009 | Kim | |
| 2011/0218561 A1 * | 9/2011 | Oguchi | A61B 17/32 |
| | | | 606/167 |
| 2011/0236853 A1 | 9/2011 | Shimoo | |
| 2011/0243673 A1 | 10/2011 | Svagr | |
| 2011/0319895 A1 * | 12/2011 | Gamache | A61B 17/1615 |
| | | | 606/79 |
| 2012/0083816 A1 | 4/2012 | Hajgato et al. | |
| 2012/0136379 A1 | 5/2012 | Haddad | |
| 2014/0099598 A1 * | 4/2014 | Wang | A61C 3/00 |
| | | | 433/144 |
| 2014/0370458 A1 | 12/2014 | Lee | |
| 2016/0367281 A1 | 12/2016 | Gee et al. | |
| 2019/0029695 A1 * | 1/2019 | Huwais | A61B 17/1615 |
| 2019/0201163 A1 * | 7/2019 | Buist, Sr. | A61C 1/084 |
| 2019/0201168 A1 * | 7/2019 | Buist, Sr. | A61C 3/02 |
| 2019/0350613 A1 * | 11/2019 | Buist, Sr. | A61B 17/3211 |
| 2021/0128175 A1 * | 5/2021 | Aldi | A61C 1/18 |

FOREIGN PATENT DOCUMENTS

| | | |
|---|---|---|
| CN | 203379191 U | 1/2014 |
| CN | 203789985 U | 8/2014 |
| CN | 204744313 U | 11/2015 |
| CN | 106725718 | 5/2017 |
| DE | 102005016380 A1 | 10/2006 |
| DE | 102013225947 | 6/2015 |
| EP | 1488745 A1 | 12/2004 |
| EP | 2110097 | 10/2009 |
| KR | 101628648 | 6/2016 |
| WO | WO1994022380 A1 | 10/1994 |
| WO | WO2016024681 | 2/2016 |

* cited by examiner

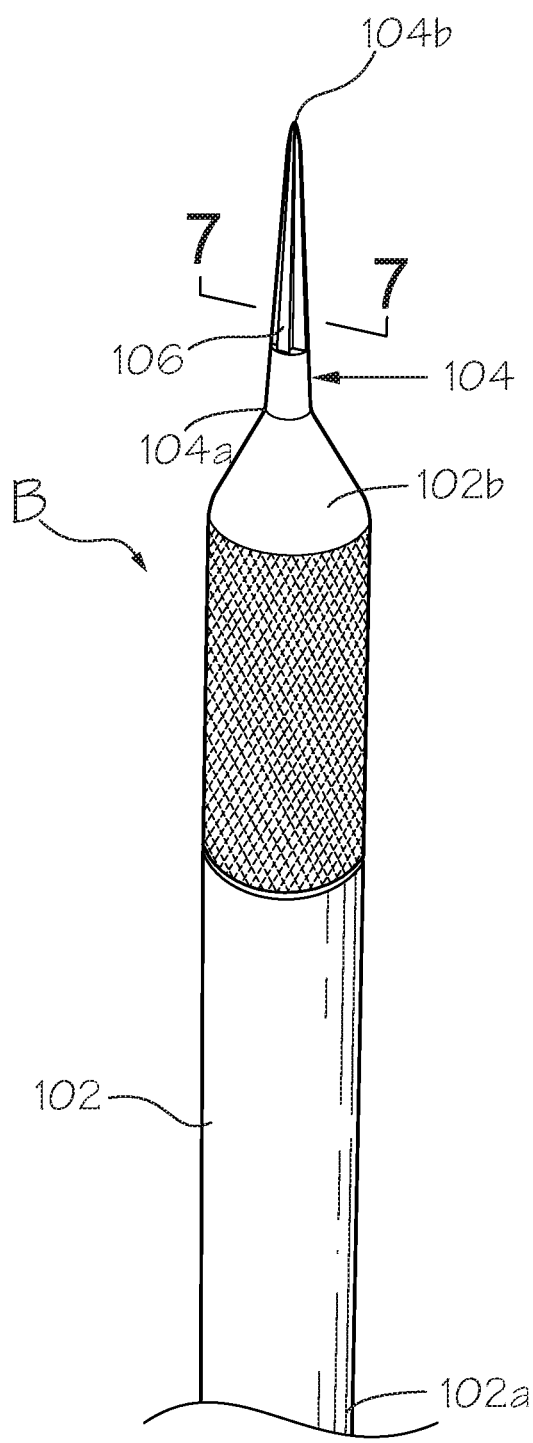
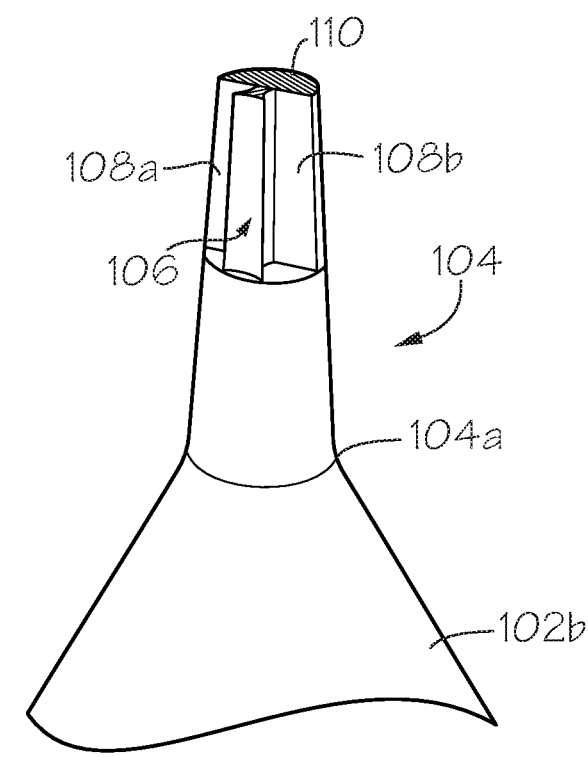
Fig. 6
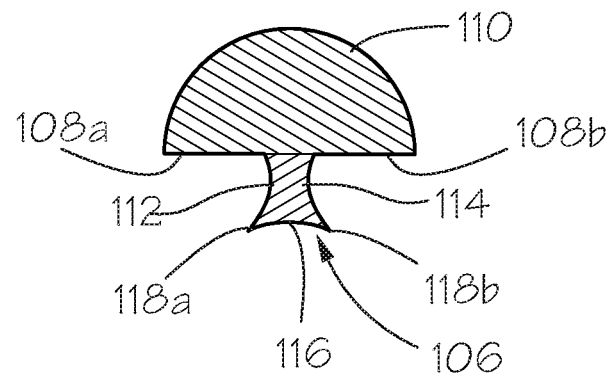
Fig. 5
Fig. 7

METHOD AND APPARATUS FOR SURGICALLY PLACING A DENTAL IMPLANT

BACKGROUND OF THE INVENTION

1) Field of the Invention

The present invention relates to a method of placing a dental implant without the use of traditional tools such as a mallet or an electric drill to create the opening in the patient's jaw bone that will receive the dental implant. This method may employ the use novel and improved tools for creating the implant opening said tools are capable of being operated solely by hand, thus allowing the implant opening to be created with a greater level of control and precision. Because traditional tools like an electric bone drill or a mallet, are not used to create the implant opening, the patient receiving an implant according to this method will suffer less trauma to the implant site and will experience a shorter recovery time after placement of the implant. This method also allows the implant to be placed in less time that is ordinarily required when prior art methods and/or tools are used.

2) Description of Related Art

In traditional methods, an implant opening is created either by using an electric bone drill to drill an implant opening in the patient's bone at the implant site or a piercing instrument such as an osteotome that is hammered into the patient's bone by a mallet.

Each of these methods has its disadvantages. One common disadvantage is the lack of control and precision provided by these tools. The speed at which an electric drill rotates exacerbates the effects of any slight misdirection of the drill bit during the procedure. The use of a mallet to hammer an osteotome into a patient's jaw provides even less precision and control. If the opening created by use of these tools is not precise enough, bone grafting, which is painful, expensive and time consuming, may be necessary to allow a new opening to be created.

The use of mallets also creates a great deal of trauma. Use of a mallet to hammer the osteotome into the patient's jaw can lead to a labyrinthine concussion, affecting the inner ear and/or acoustic nerve and resulting in the patient suffering from vertigo. In less extreme cases, the type of puncture wound created by the use of an osteotome that is hammered into the bone by a mallet heals more slowly than an opening that it created using more precise techniques.

Accordingly, it is an object of the present invention to provide a novel and non-obvious method of placing a dental implant that provides a higher degree of precision and control for creating the dental implant opening.

It is another object of the present invention to provide a novel and non-obvious method of placing a dental implant that reduces the trauma suffered at the implant site.

It is another object of the present invention to provide a novel and non-obvious method of placing a dental implant that does not require the use of any motorized or electric tools to place the dental implant.

It is another object of the present invention to provide a novel and non-obvious method of placing a dental implant that does not require the use of a mallet or other hammer-like tool to create the dental implant opening.

It is another object of the present invention to provide surgical instruments that can be used in this novel and non-obvious method.

SUMMARY OF THE INVENTION

The above objectives are accomplished according to the present invention by providing a method of surgically placing a dental implant. In one embodiment, the steps of said method comprise: (1) applying a force to a piercing instrument to direct said piercing instrument apically toward a desired portion of a bone so as to create an opening in the bone, said opening having a diameter of between 1 and 3 millimeters; applying a force to a first cutting instrument to direct said first cutting instrument toward said opening to incise the bone surrounding said opening in at least one direction, wherein said first cutting instrument comprises: a handle; a pick carried by said handle; and, a blade stabilizing channel disposed in at least a portion of the length of said pick, wherein said blade stabilizing channel is adapted to receive a cutting blade such that said cutting blade extends along at least a portion of said pick; (2) inserting a distal end of a second cutting instrument into said opening and rotating said distal end of said second cutting instrument, wherein said second cutting instrument comprises: a proximal end forming a handle; a distal end including a radiused surface that is adapted to engage the surface of the bone surrounding said opening and a cutting blade disposed opposite of said radiused surface, said cutting blade having a first side, a second side and a top interconnecting said first side and said second side, wherein each of said first side and said second side extend away from said radiused surface; a cutting edge defined by said first side and said top, wherein said first cutting edge is adapted to remove at least a portion of the bone surrounding said opening when said cutting blade engages the bone; and, whereby when said distal end is inserted into said opening, a first section of the bone is engaged by said radiused surface while a second section of the bone is simultaneously engaged by said cutting blade so that when said distal end is rotated, said first cutting edge removes bone from the second section of the bone; and (3) inserting a dental implant into said opening.

In at least one embodiment, the first cutting instrument further comprises: a blade carrier having a proximal end that is carried by said handle and a distal end that carries said pick, wherein said blade carrier includes a clamping plate that is operable between an engaged position for securing said cutting blade to said blade carrier and a disengaged position for releasing said cutting blade from said blade carrier; and, wherein said blade stabilizing channel is defined by a base, a first side wall and a second side wall and said clamping plate forms at least a portion of said first side wall of said blade stabilizing channel and said clamping plate is adapted to clamp said cutting blade between said clamping plate and said second side wall of said blade stabilizing channel when said clamping plate is in said engaged position.

In at least one embodiment, the force applied to said piercing instrument and/or said first cutting instrument is a hand force that is applied without the use of an instrument to create any of the force being applied to said piercing instrument. In one embodiment, the diameter of the opening created by the piercing instrument and/or the first cutting instrument is between 1 and 3 millimeters.

In one embodiment, the step of applying a force to said first cutting instrument to direct said first cutting instrument toward said opening further comprises the step of rocking the cutting blade of the first cutting instrument back and forth to incise the bone surrounding said opening in at least one direction.

In one embodiment, the step of inserting a dental implant into said opening further comprises the step of screwing the implant into the bone by using a hand operated driver.

In alternate embodiments, not all of the above steps need to be performed. In yet alternate embodiments, the steps need not be performed in the order listed above.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 5 shows a side elevation view of an embodiment of a second cutting tool that may be used in accordance with the present invention;

FIG. 6 shows a close up view of a portion of an embodiment of a second cutting tool that may be used in accordance with the present invention, said view having a cross sectional view of the cutting blade of the second cutting instrument;

FIG. 7 shows a cross sectional view of the cutting blade of the second cutting tool that may be used in accordance with the present invention;

Figure 1:
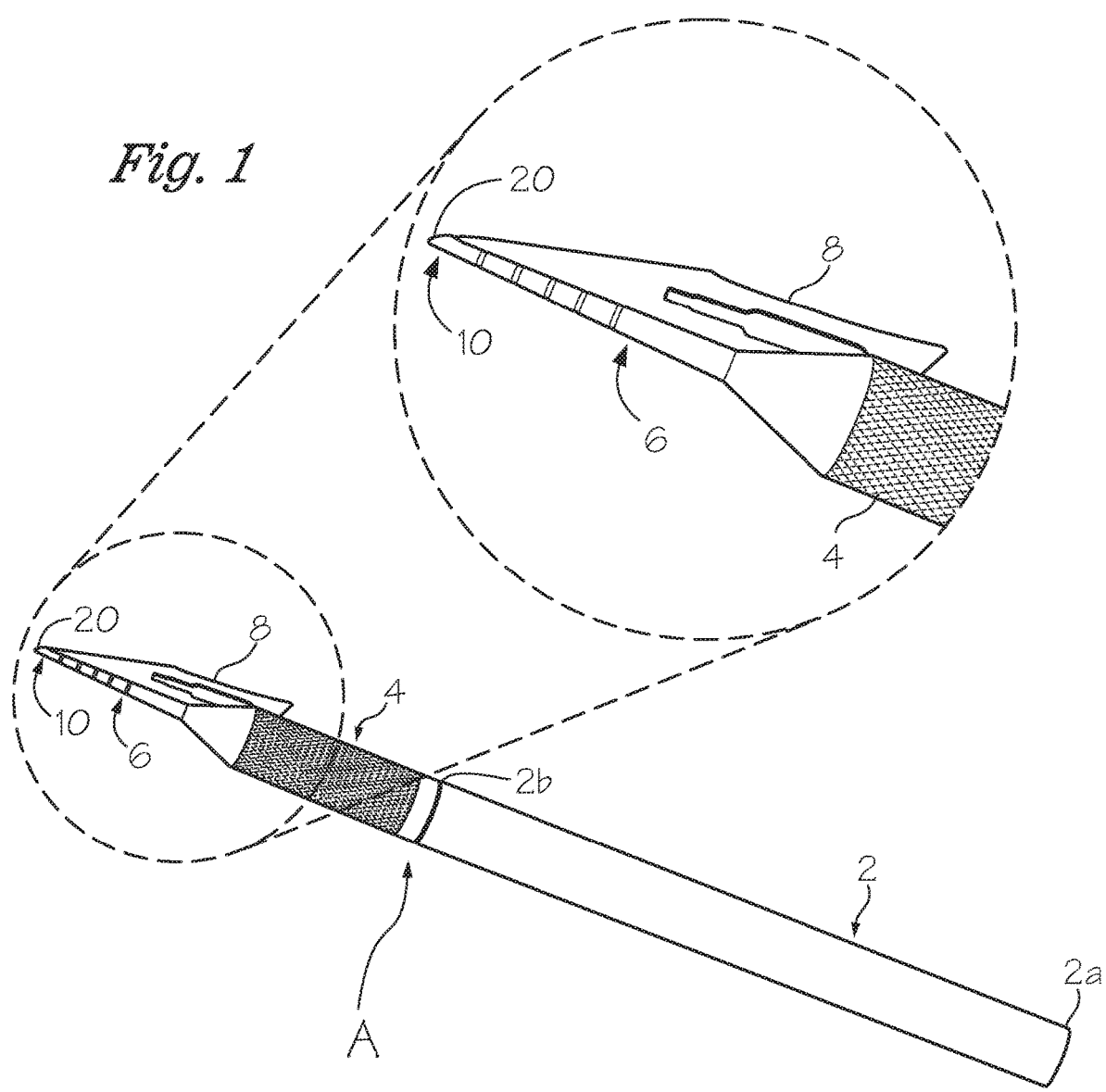
FIG. 1 shows a perspective view of an embodiment of a first cutting instrument that may be used in accordance with the present invention with a blown up portion illustrating a portion of the first cutting instrument.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Instruments that May be Used with the Present Invention

The sections below provide a description of instruments that may be used in accordance with the present invention. The inclusion of a particular instrument in the below description does not indicate that the tool must be used to carry out the present invention or that the instrument must be used in the order in which the instrument appears in the below description. The below description is intended only to provide a description of instruments that may be used in accordance with the present invention. The method of using the instruments in accordance with the present invention will be more fully described in the below section entitled "Method For Surgically Placing A Dental Implant."

The Piercing Instrument

One of the tools that may be used in accordance with the present invention is a piercing instrument that is capable of puncturing or otherwise creating an implant opening in the patient's bone at the implant site. Such tools, such as osteotomes, are generally known. As can be seen in FIG. 9, the piercing instrument, which is generally shown as C, has a proximal end 302 that includes a handle 304 and a distal end 306 that includes a tapered or pointed tip 308 that is capable of piercing or puncturing the bone to create an implant opening.

The First Cutting Instrument

Figure 2:
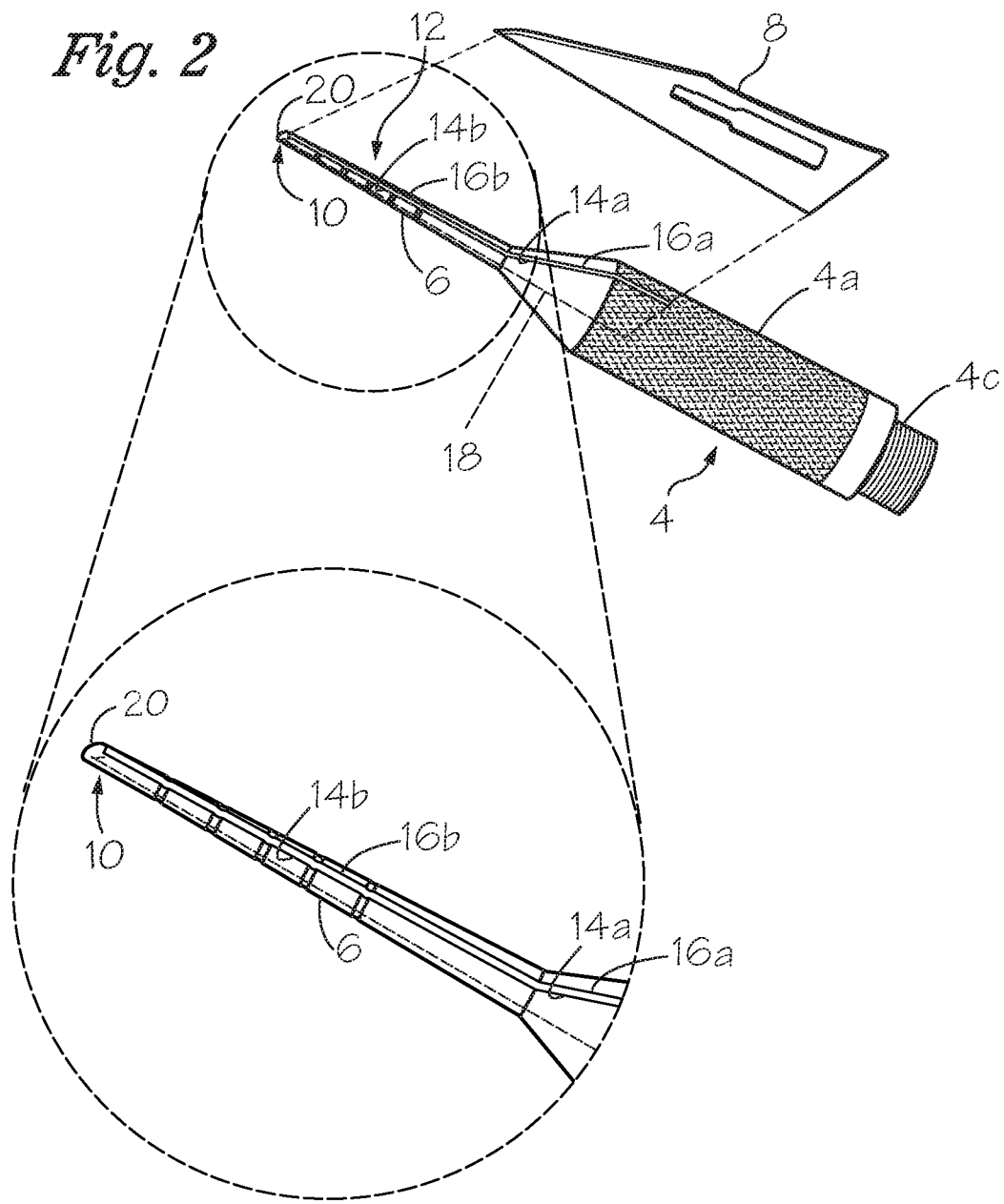
FIG. 2 shows a perspective view of an embodiment of a first cutting instrument that may be used in accordance with the present invention with a blown up portion illustrating a portion of the first cutting instrument.
Figure 3:
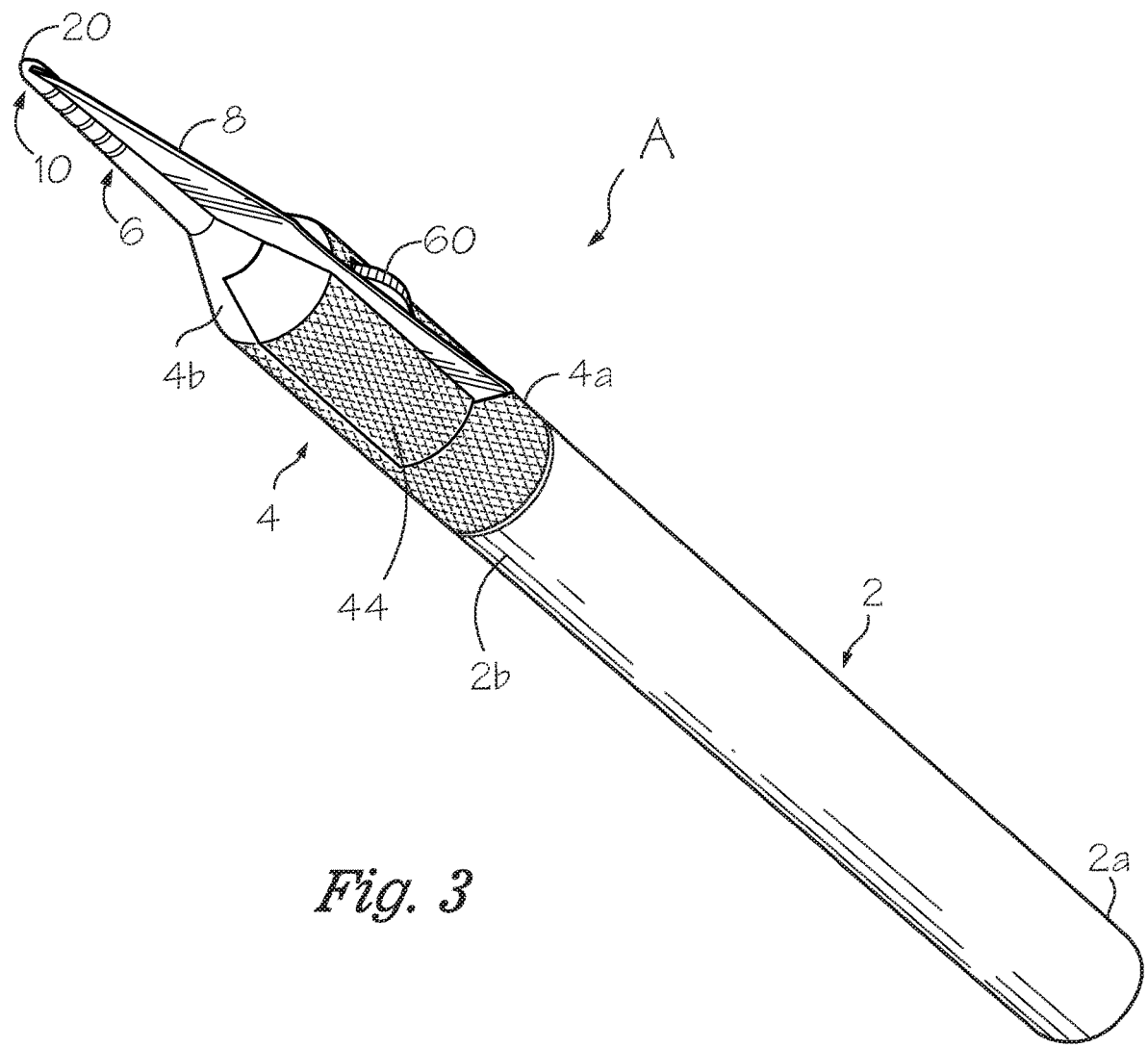
FIG. 3 shows a perspective view of an embodiment of a first cutting tool that may be used in accordance with the present invention.

Referring now to FIGS. 1-3 an embodiment of a first cutting tool that may be used in the present invention is generally shown as A. The first cutting tool is described more fully in U.S. patent application Ser. No. 15/860,799, said application being incorporated by reference as if fully repeated and set forth herein.

The first cutting tool includes a handle 2, a blade carrier 4 and a pick 6. The first cutting tool further includes a blade stabilizing channel 12 that is formed in and extends along at least a portion of the blade carrier 4 and pick 6. The channel 12 is adapted to receive and secure a cutting blade 8. As will be described in more detail below, the first cutting tool is used to create a dental implant opening in a patient's jaw or to widen an existing dental implant opening so that a dental implant may be inserted into the opening.

Generally speaking, the dental implant opening is created or widened when the pick 6 is forced into a patient's jaw bone (or the previously created implant opening). As the pick 6 enters the patient's bone at the desired implant site, the cutting blade 8 can then cut or incise an opening for a dental implant, said opening also being known as a dental implant opening (shown as 300 in FIGS. 9-12). By securing a cutting blade 8 in the blade stabilizing channel 12, the first cutting tool can be used to cut a dental implant opening rather than puncturing such an opening. Even where the dental implant opening has been created by the use of the piercing instrument, the first cutting instrument can be used to widen the opening so as to minimize the size of the initial opening that needs to be created and/or punctured by the piercing instrument. The result is that a dental implant opening that has been cut has cleaner, straighter edges that are likely to heal more quickly and less painfully than the edges of an opening that has been punctured. Moreover, an implant opening that has been cut can be placed in the patient's bone with more precision than an opening that has been punctured.

In the shown embodiment, the elongated handle 2 has a proximal end 2a that may be grasped by the user and a distal end 2b which carries the blade carrier 4. While the shown embodiment includes a handle having a generally cylindrical shape, any other shape suitable for grasping the tool may be used. As will be described in more detail below, the blade carrier 4 is adapted to receive a cutting blade 8 and to secure the cutting blade to the tool. In the shown embodiment, the blade carrier 4 includes a first cylindrical portion 4a that has the same general shape as the handle 2 so that the blade carrier 4 generally extends or lengthens the handle 2. In alternate embodiments, however, the first portion 4a of the blade carrier 4 may have a shape that is different from the handle. This would especially be true when the handle 2 has an ergonomical shape designed to aid in the gripping of the handle. The blade carrier 4 also includes a tapered or frustroconical section 4b. In alternate embodiments, the blade carrier 4 may only have one section such that the entire blade carrier could have one of a number of shapes such as a conical, frustroconical, cylindrical or square.

In the shown embodiment, a pick 6 extends from the tapered section 4b of the blade carrier 4. When the first cutting tool is being used to create the dental implant opening, the pick 6 generally serves as the first point of contact between the first cutting instrument and the patient's jaw and assists with creating the dental implant opening. In the shown embodiment, pick 6 has a generally conical shape which tapers to a pointed tip 10. In alternate embodiments, pick 6 may have any number of shapes, including cylindrical. Preferably, the pick will include a pointed tip 10. The tip 10 is designed to puncture a patient's jaw bone when a sufficient force directed towards the patient's jaw is applied to the handle 2. When the first cutting tool is being used to widen or incise a previously created implant opening, the pick 6 and the cutting blade 8 may simultaneously engage the patient's bone as will be described in more detail below.

As can be seen in FIG. 2, a blade stabilizing channel 12 is formed in at least a portion of the blade carrier 4 and extends through at least a portion of the pick 6. The blade stabilizing channel is adapted to receive and support the cutting blade 8 and is defined by a first side wall 14, a second opposing side wall 16 and a base 18 interconnecting the two side walls. In one embodiment, such as the one shown in FIGS. 1-3, the first and second side wall 14 and 16 extend continuously along the length of the entire blade stabilizing channel 12. In another embodiment, such as the one shown in FIGS. 3-4, one or both of the stabilizing channel's side walls 14 and 16 may be defined by two or more separate walls (for example 14 and 15 of FIG. 4) that together extend the entire length of the blade stabilizing channel 12. As can be seen in FIG. 2, in at least one embodiment, the depth of the channel 12 varies because the height of the side walls 14a and 16a at a point where they are formed by the blade carrier 4 is greater than the height of the side walls 14b and 16b at a point where they are formed by the pick 6. When the blade 8 is inserted in the channel 12, the base 18 and side walls 14 and 16 of the channel 12 support the blade 8 and prevent it from shifting or wobbling during use. The greater height of the side walls 14a and 16a that are formed by the blade carrier 4 help provide additional stability to the cutting blade 8 when in use. In one embodiment, the blade 8 is secured in the blade stabilizing channel 12 by means of an adhesive. In such an embodiment, the adhesive may be applied at one or more points along the channel's base 18 and/or side walls 14 and 16. In alternate embodiments, however, the blade 8 is secured in the blade stabilizing channel 12 by means of friction whereby the width of the channel 12 is such that blade 8 is squeezed between the blade stabilizing channel's side walls 14 and 16. In yet other embodiments, the blade could be permanently disposed in the blade stabilizing channel 12 by means of welding or any other means generally known.

In the shown embodiment, the blade stabilizing channel 12 extends from the blade carrier 4 to the tip 10 of the pick 6 and into a sheath 20 that is formed in the tip 10 of the pick 6. The sheath 20 is adapted to receive the tip of the cutting blade 8 when the cutting blade is placed in the channel 12. The sheath 20 protects the blade and prevents it from breaking or otherwise becoming lodged in the patient's jaw during use by ensuring that the tip 10 of the pick 6 is the first point of contact with the patient's jaw (or at least that the cutting blade 8 is not the first point of contact with the patient's bone). In the shown embodiment, the sheath 20 is formed by and integral with the tip 10 of the pick 6. In alternate embodiments, however, the sheath 20 could be connected to or formed around the tip 10 of the pick such that the sheath 20 could be removable.

In alternate embodiments, however, the channel 12 could extend through the tip 10 of the pick 6 such that no sheath is formed by or included on the tip 10 of the pick 6. In such embodiments, however, it is desirable for the channel 12 to extend far enough into the blade carrier 4 such that the blade 8 would not extend past the tip 10 of the pick when placed in the channel 12. If the blade 8 were allowed to extend past the tip 10 of the pick, the likelihood that the blade would break or become lodged in the patient's jaw during use would be increased, especially if the first cutting instrument were used to create the implant opening (as opposed to simply widening a previously created implant opening).

Figure 4:
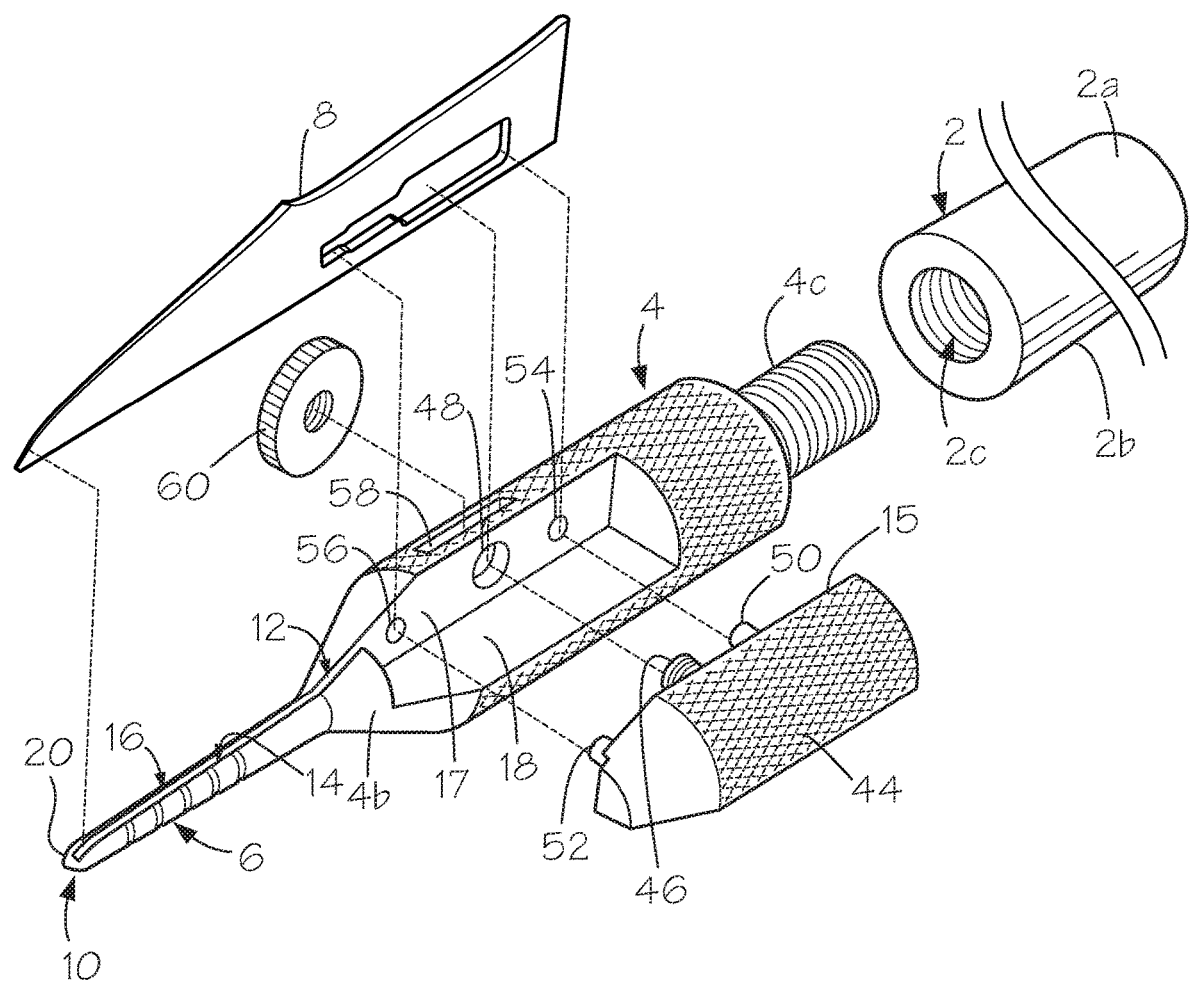
FIG. 4 shows an exploded view of an embodiment of a first cutting tool that may be used in accordance with the present invention.

Referring now to FIGS. 3-4, another embodiment of the first cutting instrument is illustrated. In this embodiment, the first cutting instrument includes a handle 2 having a proximal end 2a and a distal end 2b, wherein the distal end 2b has a threaded opening 2c defined therein. The threaded opening 2c is adapted to receive the threaded post 4c disposed on the blade carrier 4.

In this embodiment, the blade carrier 4 includes a clamping plate 44 that is removably, slideably or adjustably connected to the blade carrier 4. The blade carrier 4 includes a blade support wall 17 that is substantially flat and the clamping plate 44 includes an inner surface 15 that is substantially flat. In this embodiment, the blade support wall 17 and the clamping plate's inner wall 15 form at least a portion of the two side walls 14 and 16 of the blade stabilizing channel 12. In the shown embodiment, the clamping plate includes a locking post 46, which in the shown embodiment, is threaded and adapted to be received by a first opening 48 that is defined in the blade support wall 17 that is defined in the blade carrier 4. The inner wall 15 of the clamping plate 44 further includes two support posts 50 and 52 that are spaced from the locking post 46. These support posts 50 and 52 are adapted to be received by corresponding openings 54 and 56 defined in the blade support wall 17. The clamping plate 44 has an engaged position for securing the cutting blade 8 in the blade stabilizing channel 12 and a disengaged position for releasing the blade 8 for allowing the blade to be removed from the blade stabilizing channel 12. When placed in the engaged position, the inner wall 15 of clamping plate 44 is placed in contact with or adjacent to the blade support wall 17 and the locking post 46 and two support posts 50 and 52 are received by the openings 48, 54 and 56.

In this embodiment, the blade carrier 4 further includes a slot 58 that is defined in the exterior surface of the blade carrier 4 so that the slot is located behind the blade support wall 17 and extends into the blade carrier 4 such that the locking post opening 48 extends into the slot 58. The blade carrier 4 further includes a locking nut 60 that is disposed in the slot 58 so that the locking post 46 passes through the corresponding opening 48 in the blade support wall 17 and the locking nut 60 engages the locking post 46 so as to force the clamping plate's inner surface 15 towards the blade support wall 17 so as to place the clamping plate in the engaged position so that the blade 8 can be maintained in the blade stabilizing channel 12. In this embodiment, the blade support wall 17 and the clamping plate's inner surface 15 create a portion of the blade stabilizing channel's first and second side walls 14 and 16.

In the shown embodiment, the clamping plate may be switched back and forth from the engaged position and the disengaged position by varying the distance between the blade support wall 17 and the clamping plate's inner surface 15 through the use of the locking nut 60. In the shown embodiment, the locking nut 60 is disposed in the slot 58 such that at least a portion of the locking nut extends past the opening of the slot 58 and above the exterior surface of the blade carrier 4 so that the locking nut may be easily accessed and turned by the user.

When the clamping plate 44 is in the engaged position, the two support posts 50 and 52 are received by the two corresponding openings 54 and 56 to reduce or prevent the clamping plate 44 and/or the blade 8 from rotating or shifting when the blade 8 is in the blade stabilizing channel 12. However, the use of a blade stabilizing channel 12 having a length that is approximately the same length as the blade and a base 18 that contacts the back of the blade 8 will also help reduce the possibility that the blade rotates or shifts within the blade stabilizing channel 12 during use.

The Second Cutting Instrument

Referring now to FIGS. 5-7 an embodiment of a second cutting tool that may be used in the present invention is generally shown as B. The second cutting tool is described more fully in U.S. patent application Ser. No. 15/981,964, said application being incorporated by reference as if fully repeated and set forth herein.

In one embodiment, the second cutting instrument includes an elongated handle 102 which has a proximal end 102a that may be grasped by the user and a distal end 102b which carries a pick portion 104. The pick portion 104 has a proximal end 104a that is carried by the handle 102 and a distal end 104b that is used to penetrate and/or enter the patient's bone through the implant opening. At least part of the pick portion 104 has a generally flat surface 108a and 108b and a radiused surface 110 so that at least part of the pick portion 104 has a cross section that is generally semi-circular in shape (when viewed without reference to the cutting blade 106). In alternate embodiments, however, the flat surfaces 108a-108b could be angled in relation to one another, thus, giving the pick portion 104 a cross section that is generally shaped like a pie wedge or a pie missing a pie wedge (when viewed without reference to the cutting blade 106). In yet another embodiment, the surfaces 108a and 108b could be radiused giving the pick portion 104 a generally "U" or crescent shape (when viewed without reference to the cutting blade 106). In other embodiments, the flat surface 108a-108b of the pick portion 104 could be slightly rounded or beveled. In the shown embodiment, the pick's proximal end 104a has a cross sectional shape that is generally cylindrical while the distal end 104b forms a tapered point. In alternate embodiments, however, proximal end 104a could have a cross section that is generally semicircular in shape (when viewed without reference to the cutting blade 106) and the distal end 104b could form a blunted, rounded end or having any number of cross sectional shapes.

The pick portion 104 further includes a cutting blade 106 that extends along at least a portion of the generally flat surface 108a and 108b of the pick portion 104 so that the cutting blade 106 is generally opposite from the radiused surface 110. The cutting blade 106 has a first side 112 and a second side 114, each of which extend away from the radiused surface 110 and in a generally perpendicular direction from the flat surface 108a and 108b. The two opposing sides 112 and 114 are interconnected by a top surface 116. In the shown embodiment, each of the two sides 112 and 114 and the top 116 have a concave surface. The cutting blade 106 further includes a first cutting edge 118a and a second cutting edge 118b, wherein the first cutting edge is defined by the first side 112 and the top 116 and the second cutting edge is defined by the second side 114 and the top 116. The concave surface of the two sides and top 112, 114 and 116 are preferable and help define the first and second cutting edges 118a and 118b so that they have sharp edges but the concave surfaces are not necessary. In at least one embodiment, however, the top surface 116 is not concave. In other embodiments, neither of the two sides 114 and 116 nor the top 116 have a concave surface. In another embodiment, the top 116 has a concave surface but the two sides 114 and 116 do not.

In the shown embodiment, the pick portion 104 is generally tapered so that the diameter of the distal end 104b is less than the diameter of the proximal end 104a. In the shown embodiment, the cutting blade 106 is also tapered such that the width of the top surface 116 narrows as it approaches the distal end 104b of the pick portion 104. In the shown embodiment, the cutting edges 118a and 118b are angled towards one another as they extend from said proximal end 104a of the pick portion until they meet to form the tapered point at the distal end 104b. In alternate embodiments, however, the cutting blade 106 may maintain a uniform width despite the fact that the pick portion 104 tapers as it extends towards the distal end 104b. In such an embodiment, the cutting blade 106 may or may not extend all the way to the distal end 104b. In another embodiment, the cutting blade 106 may taper but the width of the top surface 116 of the cutting blade 106 may be such that the cutting edges 118a-118b do not meet at a point adjacent to the distal end 104b. In yet another embodiment, the pick portion 104 does not taper at all as it extends from the proximal end 104a to the distal end 104b. In such an embodiment, the cutting blade 106 may or may not taper as it extends along the pick portion such that the width of the top surface 116 may either (a) remain uniform to keep the cutting blades 118a-118b generally parallel to one another; or (b) decrease as the cutting blade 106 extends from the proximal end 104a to the distal end 104b so that the cutting blades 118a-118b meet at a point adjacent to the distal end 104b.

The Hand Operated Driver

The use of tools to drive or screw a threaded-type implant into the patient's bone are generally known in the art. Traditionally, dental threaded-type implants have been inserted by using an electric drill having a bit that fits the opening provided in the dental implant and/or its abutment. The electric drill is then used to screw or insert the dental implant into the bone surrounding the implant opening.

When placing a threaded-type implant, it may be advantageous to place the implant without the use of an electric drill or other motorized instruments so as to provide greater precision and control. One such hand operated driver is described in U.S. application Ser. No. 16/108,539, said application being incorporated by reference as if it were fully set forth and repeated herein. The use of such a hand operated driver will be discussed more fully below.

Non-threaded type implants, such as fin-type implants, are not screwed into the bone surrounding implant opening but are instead placed inside of the dental implant opening. Non-threaded type implants may be placed by hand or with the aid of instruments that are generally known in the art.

Method for Surgically Placing a Dental Implant

The below sections provide a description of the method for surgically placing a dental implant in accordance with the present invention. The inclusion of a step in the below description does not mean that the step must be performed to carry out the present invention or that the step must be performed in the order in which it appears in the below description.

Creating an Implant Opening

Figure 8:
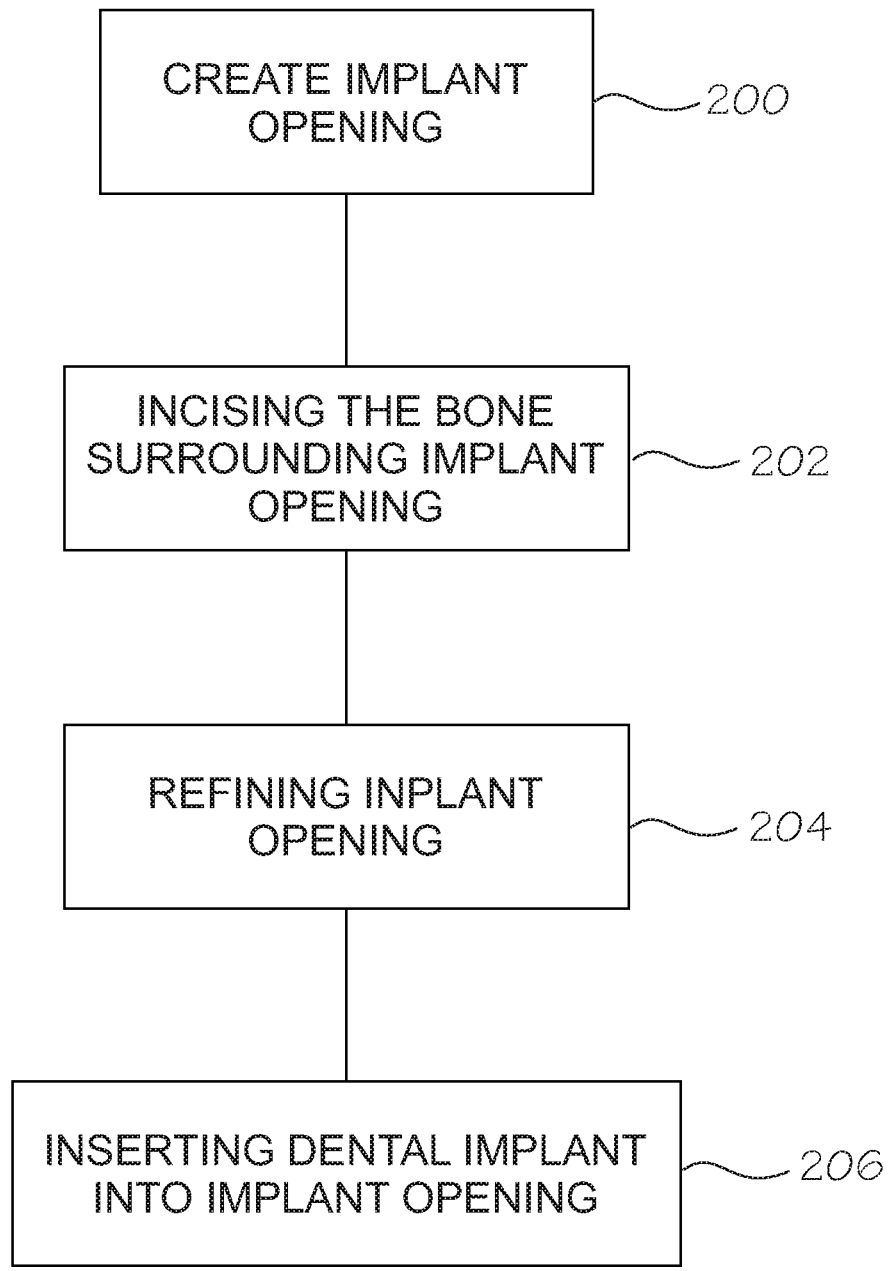
FIG. 8 shows a flow chart of the steps that may be performed in accordance with the present invention.
Figure 9A:
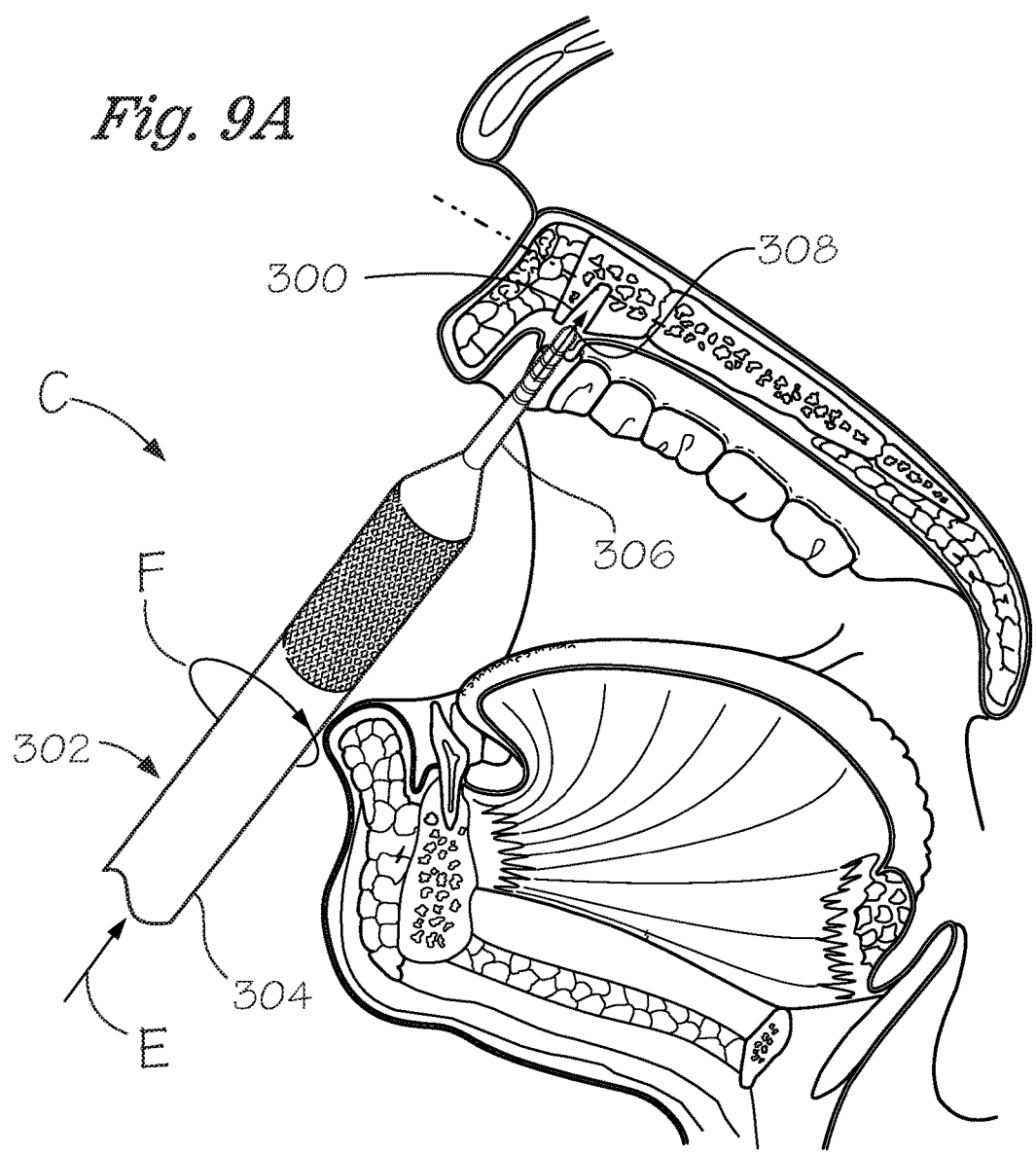
FIG. 9A shows a perspective view of the piercing instrument being used in accordance with the present invention.

As shown by the flow chart in FIG. 8, at step 200 in the method for surgically placing a dental implant, a dental implant opening is created in the patient's bone (typically the crestal cortical bone) at the desired implant location. As shown in FIG. 9A, in one embodiment, the implant opening 300 is created by using a piercing instrument, generally shown as C, to puncture a small opening in the patient's jaw at the desired implant site. The piercing instrument, which is generally known in the art, includes a handle 304 and a pick portion 306. The pick portion 306 includes a tapered tip 308 that is adapted to pierce a bone at the desired implant site. In one embodiment, the pick portion 306 is generally tapered. In alternate embodiments, the pick portion 306 has a constant diameter until it reaches the tapered tip 308.

When using the piercing instrument C, a force E is applied to the piercing instrument to direct the tapered tip 308 apically toward the desired implant site where the implant opening is to be created. Notably, the force that is applied to the piercing instrument is a hand force meaning that the force is applied without the use of any instruments such as an electric drill or a mallet to create or otherwise augment the force that is being applied to the piercing instrument by the user and his/her own strength. In at least one embodiment, the force E that is applied to the piercing instrument, which is typically applied at the handle 304, also includes a rotational or oscillating force F that causes the tapered tip 308 to rotate or twist back and forth as it enters the patient's bone. The force applied to the piercing instrument should be sufficient to cause the tapered tip 308 to penetrate the bone to the desired depth, said depth being measured by methods generally known in the art.

Figure 9B:
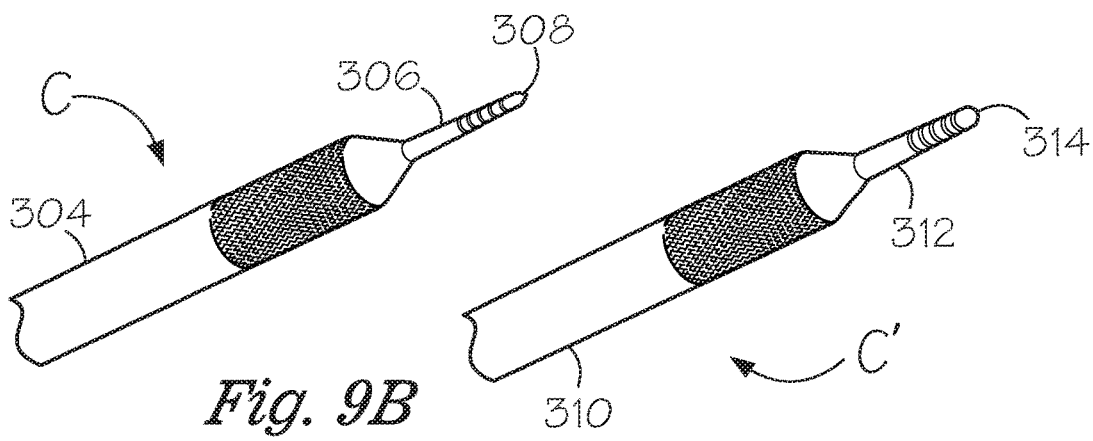
FIG. 9B shows a perspective view of two different embodiments of the piercing instrument that may be used in accordance with the present invention.

In at least one embodiment, the piercing instrument is used to create an opening that is between 1 to 3 millimeters in diameter. As shown in FIG. 9B, a first embodiment of the piercing instrument C can be used to create the initial implant opening 300, said opening having a diameter of approximately 1 millimeter, wherein the pick portion 306 of the first piercing instrument C has a diameter of approximately 1 millimeter. In such an embodiment, a second piercing instrument C' that has a pick portion 312 having a diameter of approximately 2 millimeters can be used to widen the initial implant opening by again applying a hand force to the second piercing instrument C' to direct the tapered tip 314 apically toward and/or into the implant opening 300 initially created by the first piercing instrument. The wider diameter of the pick portion 312 of the second piercing instrument C' will widen the implant opening to approximately 2 millimeters.

In alternate embodiments, the implant opening 300 can be created by simply using the second piercing instrument C' having a pick portion 312 with a greater diameter that the pick portion 306 of the first piercing instrument C. Often times, however, the piercing instrument C having a pick portion 306 with a smaller diameter is preferred because the tapered tip 308 is typically sharper than the tapered tip 314 that is included on the second, wider piercing instrument C'. Thus, the narrower piercing instrument C is often able to pierce the patient's bone more easily than the second piercing instrument C'. Depending on the size of the implant (not shown) to be inserted into the implant opening 300, an even larger piercing instrument (not shown) can be used to create and/or widen the implant opening 300 so that the opening has a diameter of approximately 3 millimeters.

In yet another embodiment, the piercing instrument can be used to mark the implant site on the patient's bone (by indentation, scratching or other methods known in the art) and a drill (electrically or hand operated) can be used to drill the implant opening 300. Alternately, the piercing instrument can be used to create an opening that has only a shallow depth and the drill can be used to deepen the opening to the desired depth. In either of these embodiments, it may be advantageous to use a hand operated driver, such as the one discussed above, in combination with a drill bit having a diameter of between 1-3 millimeters to create the implant opening. In this embodiment, a hand force E will be applied to the hand operated driver, generally shown as D in FIG. 12, to direct the appropriate bit 404 (in this case a drill bit) towards the implant site. A rotational force F will be simultaneously applied to the hand operated driver to cause the drill bit to rotate so that it creates and/or deepens the implant opening 300. Typically, the hand operated driver is only used when insufficient force is able to be applied to the piercing instrument to safely and/or effectively create the implant opening 300 such as when the patient's bone is brittle or otherwise risks splintering by use of the piercing instrument.

As will be discussed more fully below, the initial implant opening 300 could also be created with the first cutting instrument A instead of the piercing instrument C or C'. While the method of using the first cutting instrument will be described in the context of incising the bone surrounding the implant opening, the same method could be used to both create the implant opening and incise the opening in a single step.

Incising the Bone Surrounding the Implant Opening

Figure 10:
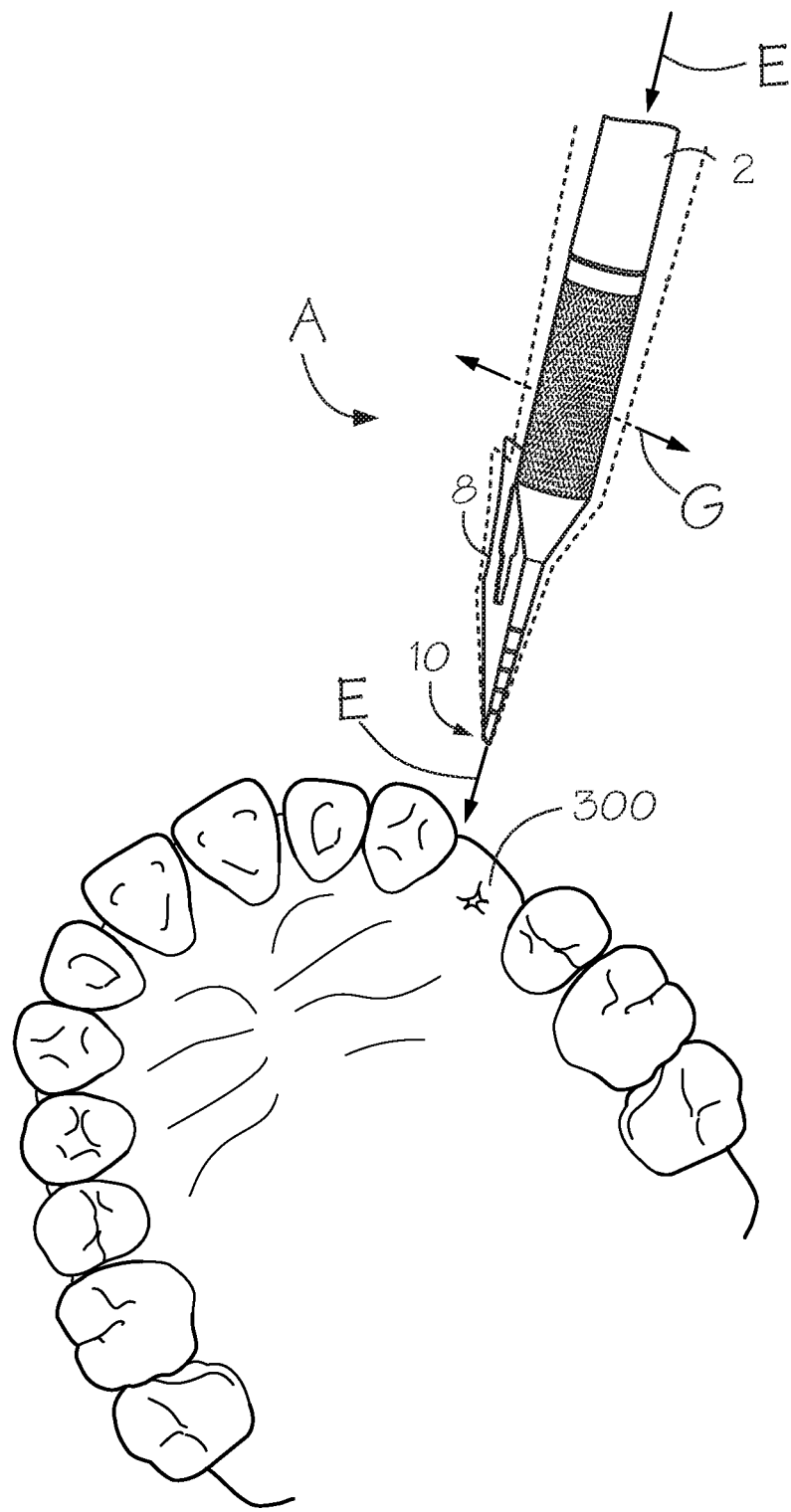
FIG. 10 shows a perspective view of the first cutting instrument being used in accordance with the present invention.

Referring to FIG. 8, the implant opening is incised at step 202. As shown in FIG. 10, this step may be achieved by use of the first cutting instrument, which is generally shown as A. Where the implant opening 300 has already been created using the piercing instrument C, the first cutting instrument A can be used to incise the opening by applying a force E, which in at least one embodiment is a hand force, to direct the tip 10 and/or sheath 20 of the first cutting instrument towards and/or into the implant opening 300. The force applied to the first cutting instrument should be sufficient to place the cutting blade 8 in contact with the bone surrounding the implant opening. While applying a sufficient vertical force E on the cutting instrument to cause the cutting blade 8 to engage the patient's bone, the cutting blade may be rocked back and forth in direction G so that it incises or cuts the bone surrounding the implant opening in at least one direction. This can be achieved by moving the handle 2 back and forth along the axis G in which the cutting blade is disposed. The phrase "rocking back and forth" or "rocked back and forth" does not necessarily mean that the motion must be repetitive. Instead, the blade can be rocked forward a single time to create the incision and then removed or otherwise disengaged from the bone. Often times, it will be desirable to incise the bone in two or more directions, in which case the tip 10 of the first cutting instrument will need to be removed (either completely or substantially) from within the implant opening 300 and reinserted in a position such that the cutting blade 8 can engage and incise the bone in the desired direction.

In at least one embodiment, the initial implant opening 300 could be both created and incised by using the first cutting instrument. In such an embodiment, the tip 10 and/or sheath 20 of the first cutting instrument A would be used to initially puncture the patient's bone. As the force E applied to the first cutting instrument continues to push the pick portion 6 of the instrument into the patient's bone, the cutting blade will engage the bone and incise the implant opening 300 created by the first cutting instrument's tip 10 and/or sheath 20, as generally described above. In this embodiment, the need to use a piercing instrument C to create the implant opening 300 is alleviated.

Refining the Implant Opening

Referring to FIG. 8, the second cutting instrument is used to refine the implant opening at step 204. In this context, the term refine is defined as preparing, adapting, modifying, improving, cutting, scraping, smoothing, shaving or creating at least one fracture in one or more surfaces of the bone surrounding the implant opening for receipt of the dental implant to be inserted therein.

Figure 11A:
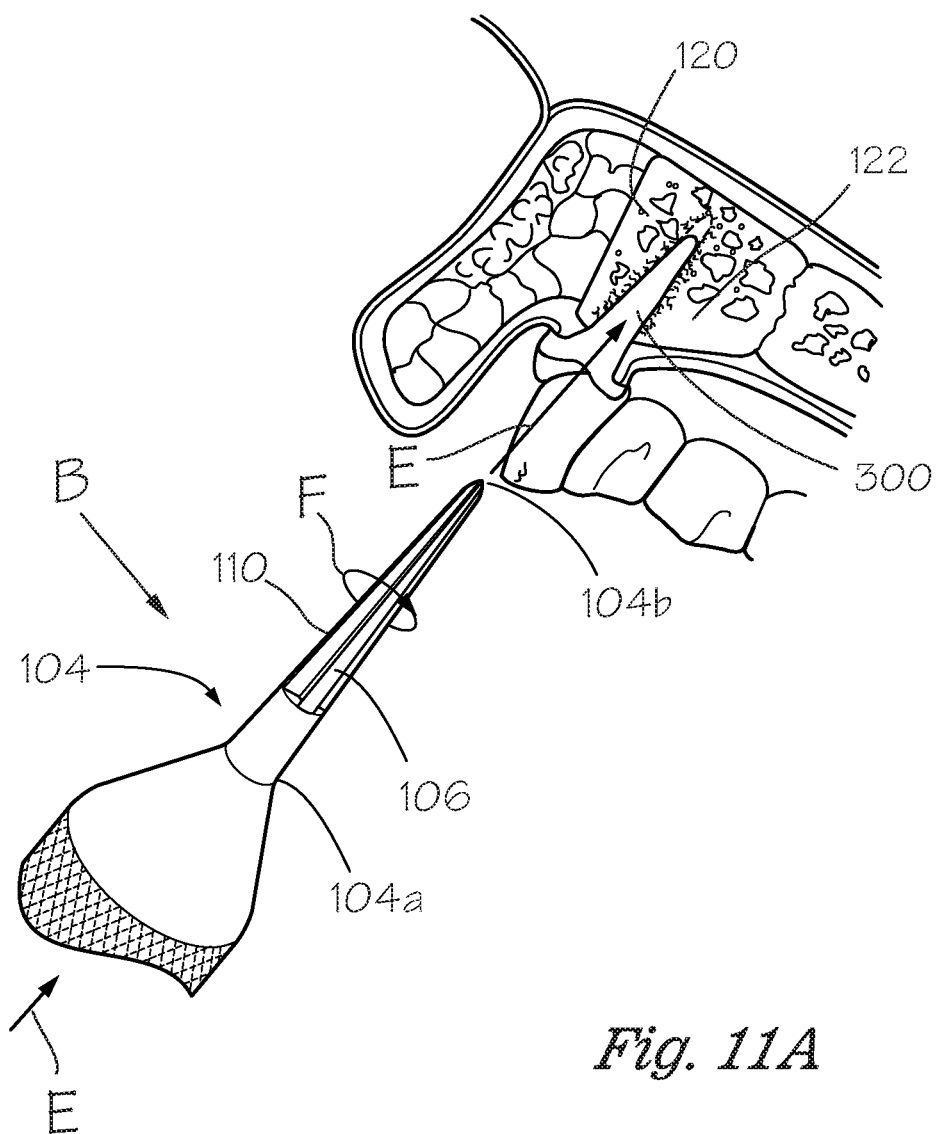
FIG. 11A shows a cross-sectional view of the second cutting instrument being used in accordance with the present invention.

Referring to FIG. 11A, the second cutting instrument, generally shown as B, can be seen while in use. After the implant opening 300 has been created, the distal end 104b of the pick portion 104 may be inserted into the opening 300. To achieve this placement, a force E must be applied to the second cutting instrument to direct the distal end 104b towards and/or into the dental implant opening 300. The distal end 104b will ordinarily be inserted so that the radiused surface 110 faces towards the patient's gums/lips and, thus, engages the facial bone 120. This way, it will be less likely that an unintentional hole will be cut into or through the facial bone 120 as would likely be the case if the cutting blade 106 engaged the facial bone. The distal end being inserted as such, the cutting blade 106 will face and/or extend towards the roof of the patient's mouth and will, thus, engage the palatal bone 122.

Both the first and second cutting edges (shown as 118a-118b in FIGS. 11C-11E) are adapted to remove at least a portion of the patient's bone when the pick portion 104 is inserted into the dental implant opening 300 and the cutting blade 106 engages the bone. As will be described more fully below, the cutting blade 106 is caused to engage the bone when a twisting force F is applied to the second cutting instrument that causes the pick portion 104 and/or the cutting blade 106 to be oscillated or rotated in at least one direction.

In embodiments where the pick portion 104 is tapered, it can be inserted into the opening 300 at a depth where both the radiused surface 110 and the cutting blade 106 will simultaneously engage different sections of the patient's bone. Once the distal end 104b has been inserted to the proper depth within the implant opening 300, pick portion 104 can be oscillated by rotating the handle 102 back and forth. As can be seen in FIGS. 11C-11E, when the handle is oscillated, a first section of the patient's bone (ordinarily the facial bone 120) is engaged by the radiused surface 110 while a second section of the patient's bone (ordinarily the palatal bone 122) is simultaneously engaged by the cutting blade 106. When rotated, the radiused surface 110 creates a number of micro fractures 126 in the first section of the patient's bone (ordinarily facial bone) so that the bone becomes more pliable and can more easily adapt to the shape of the dental implant being inserted. While the radiused surface 110 engages the first section of the bone, the first and second cutting edges 118a-118b may engage the second section of the patient's bone to remove some of the bone from that section of bone. Alternatively, the pick portion can be inserted to a depth where either the radiused surface 110 or the cutting blade 106 (but not both) engage a section of the patients' bone. This may be desirable when no additional bone needs to be removed but a section of the patient's bone needs to be made more pliable by the radiused surface 110.

Because, however, the radiused surface 110 is generally opposite from the cutting blade 106 and is preferably intended to engage a first section of bone (usually the facial bone 120) while the cutting blade simultaneously engages a second section of bone (usually the palatal bone 122), the pick portion 104 is ordinarily rotated by less than 360 degrees and preferably by 180 degrees or less. By limiting the range by which the pick portion 104 may be rotated, the likelihood that the cutting blade 106 will damage or otherwise cut the first section of bone that is being fractured by the radiused surface 110 can be reduced, if not eliminated. In at least one embodiment, the pick portion 104 and/or the cutting blade 106 is oscillated back and forth until the desired amount of bone is removed from the dental implant opening 300.

Figure 11B:
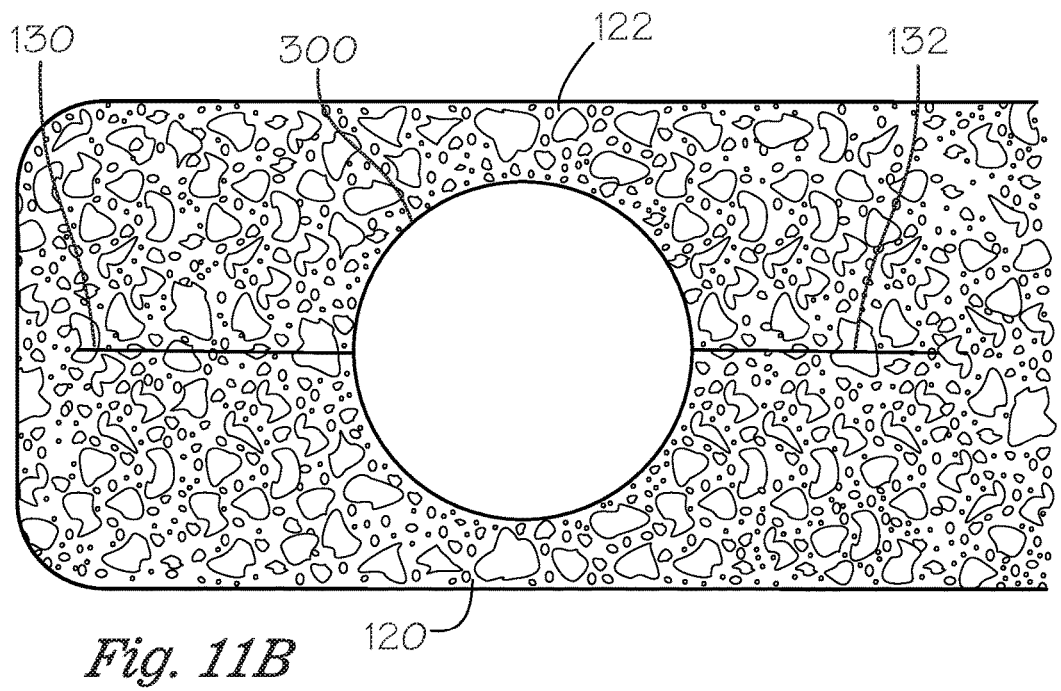
FIG. 11B shows a cross-sectional view of the implant opening that may be created in accordance with the present invention.
Figure 11C:
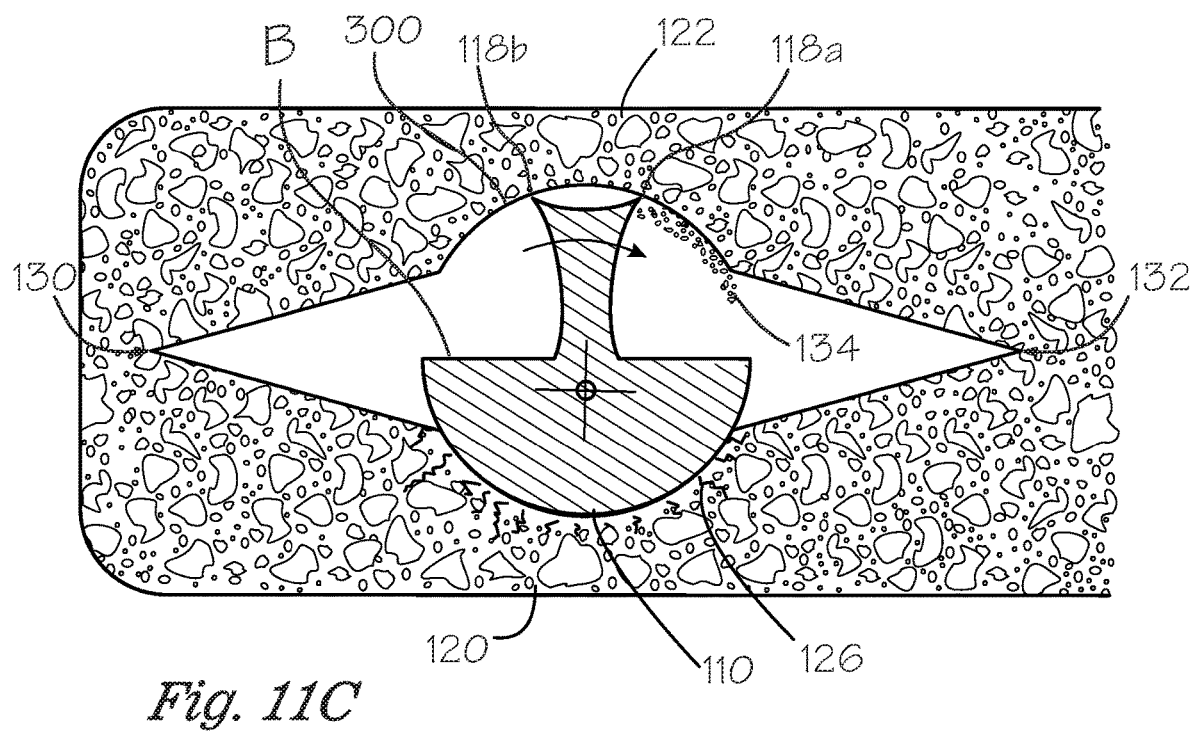
FIG. 11C shows a cross-sectional view of the second cutting instrument being used in the implant opening that may be created in accordance with the present invention.
Figure 11D:
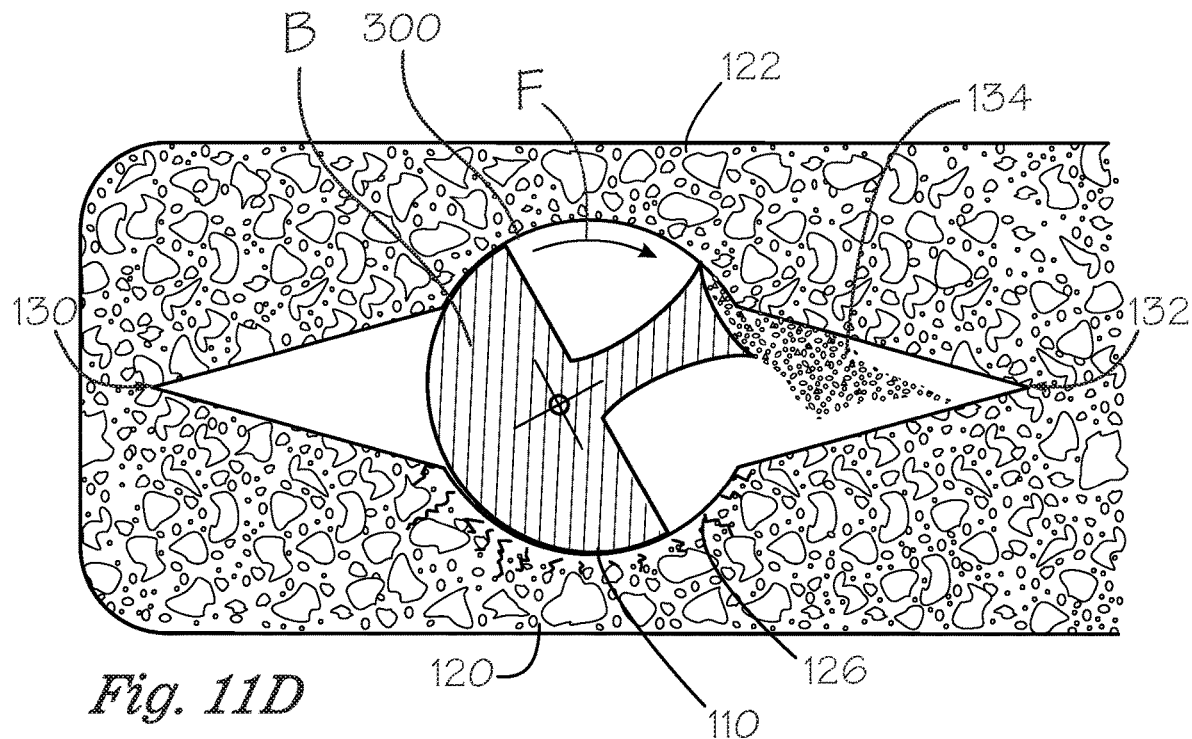
FIG. 11D shows a cross-sectional view of the second cutting instrument being used in the implant opening that may be created in accordance with the present invention.
Figure 11E:
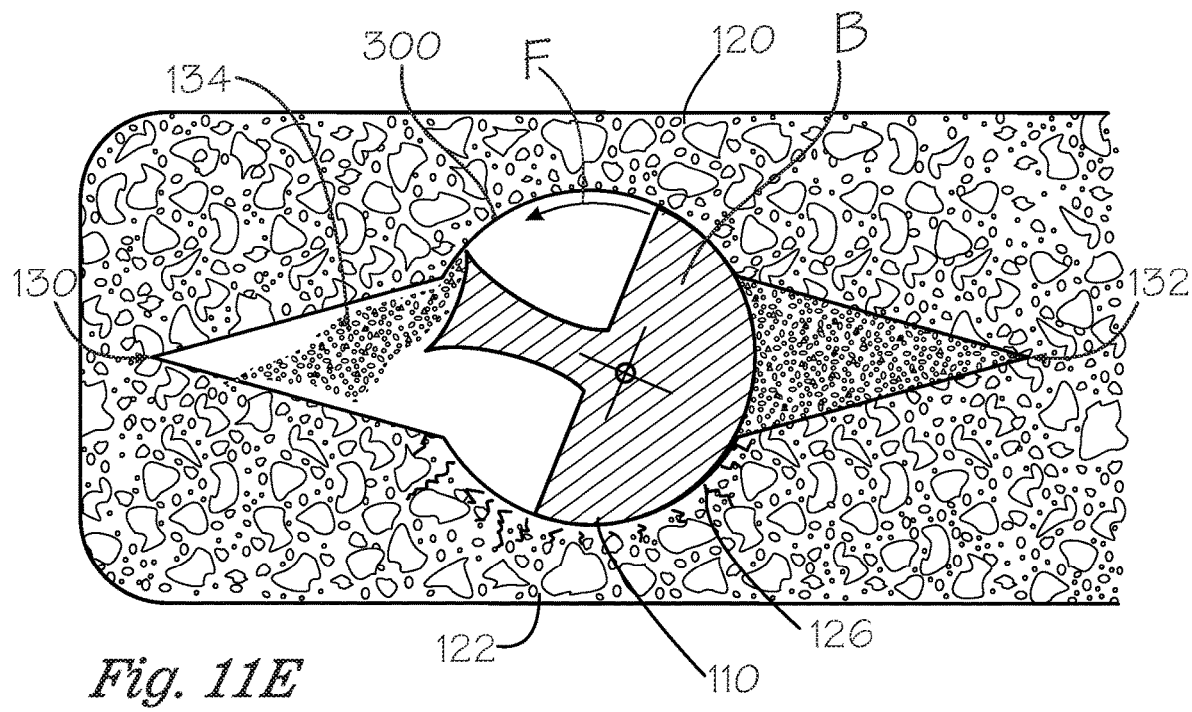
FIG. 11E shows a cross-sectional view of the second cutting instrument being used in the implant opening that may be created in accordance with the present invention.

Another advantage provided by the use of the second cutting instrument B is shown in FIGS. 11B-11E. As shown in FIG. 11B, the incisions 130 and 132 that were made by the first cutting instrument A remain generally closed in that the bone on both sides of the incision stays in close proximity to one another. Insertion of the second cutting instrument into the implant opening causes the incisions 130 and 132 to open in that the bone on each side of the incision spread farther apart from one another. As the second cutting instrument B is rotated and/or twisted, cutting edge 118a cuts or shaves portions of the bone from the second section of bone 122 (usually the palatal bone). As the second cutting instrument continues to rotate or twist, those bone shavings 134 are directed into the incision 132. This same process is repeated on the other side such that bone shavings 134 are created and directed into the other incision 130 as the second cutting instrument is rotated or twisted in the opposite direction. Moreover, the radiused surface 110 helps push the bone shavings 134 further into incision 134 and/or compress those shavings into the incisions 132 and 134 as the second cutting instrument is rotated. By doing so, the second cutting instruments helps fill in the incisions and, thus, shorten the recovery time for those incisions to heal.

Inserting the Dental Implant

Referring to FIG. 8, the dental implant is inserted into the implant opening at step 206. The implant can be inserted into the implant any number of ways, many of which are generally known in the art. Depending on the type of implant being inserted, the implant may be screwed into the bone surrounding the implant opening or it may simply be placed into the implant opening and initially held in place by friction, sutures and/or other methods generally known in the art. In some embodiments, the implant is placed by hand; in other embodiments instruments such as drivers and/or drills are used to place the implant.

Figure 12:
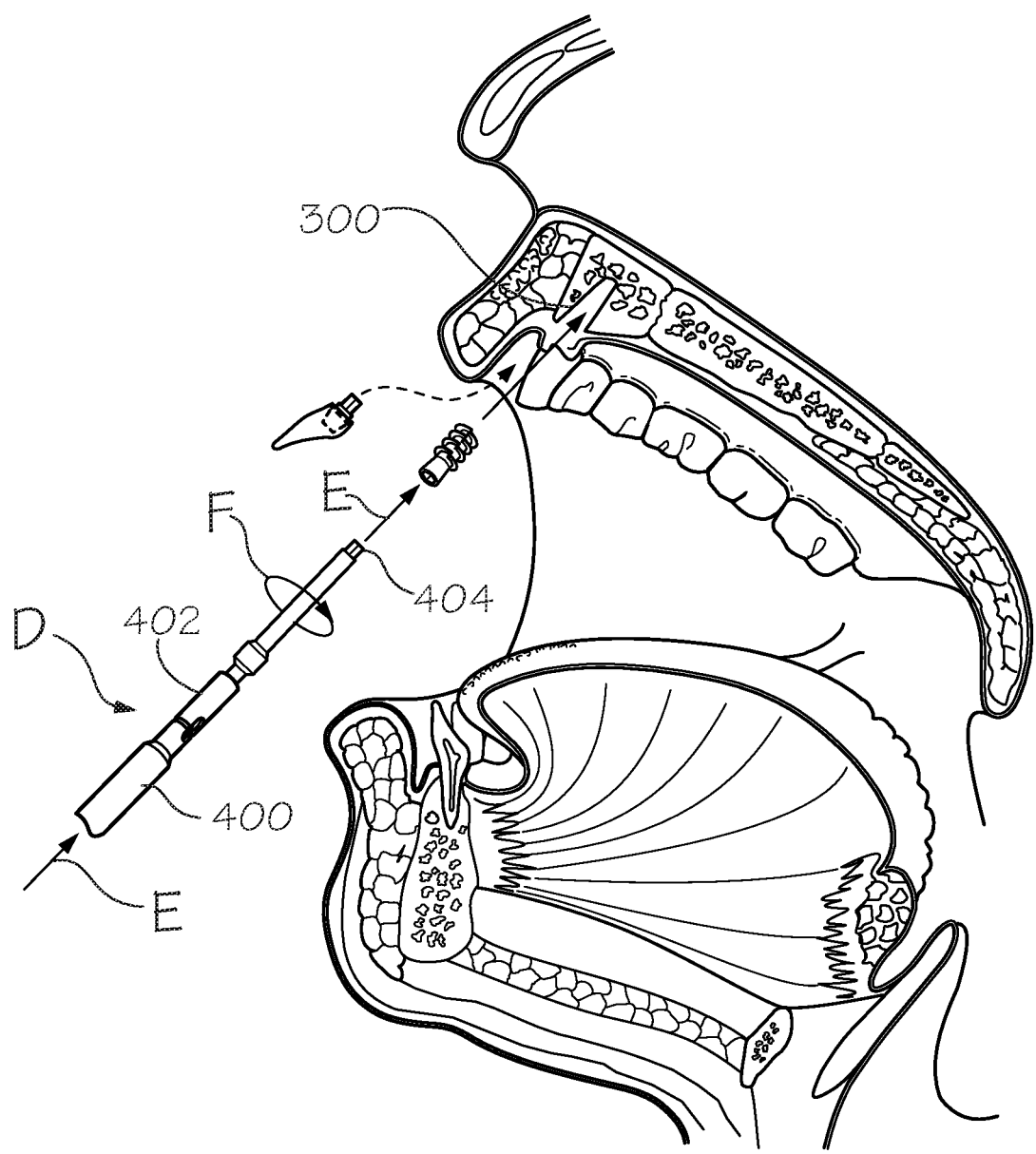
FIG. 12 shows a perspective view of the hand operated driver being used in accordance with the present invention.

In some cases it would be advantageous to use a hand operated driver to insert a dental implant into the implant opening. FIG. 12 illustrates the use of one such hand operated driver. For more information on the specific hand operated driver, reference to U.S. patent application Ser. No. 15/860,799 is made, said application being incorporated by reference as if fully repeated and set forth herein.

Referring now to FIG. 12, the hand operated driver, which is generally shown as D, includes a handle 400 and a shaft 402 that is adapted to receive and secure a tool bit 404. Any number of tool bits can be used such as drill bits, flat head bits, Phillips head bits, cutting bits, planing or shaping bits (such as chisel bits) as well as any other tool bits that are generally known, whether such bits are rotary or non-rotary in nature. Once the appropriate bit that will engage the opening provided in the dental implant and/or its abutment is inserted into the shaft 402, a force E can be applied to the hand operated driver that directs the bit 404 into the opening provided in the dental implant and towards the implant opening 300. A rotational force, such as the one shown as F, can also be applied so as to rotate the hand operated driver, to screw the implant into or out of the bone surrounding the implant opening 300.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. Method of surgically placing a dental implant comprising the steps of:
applying a force to a piercing instrument to direct said piercing instrument apically toward a desired portion of a bone so as to create an opening in the bone, said opening having a diameter of between 1 and 3 millimeters;
applying a force to a first cutting instrument to direct said first cutting instrument toward said opening to incise the bone surrounding said opening in at least one direction, wherein said first cutting instrument comprises:
a handle;
a pick carried by said handle; and,
a blade stabilizing channel disposed in at least a portion of the length of said pick, wherein said blade stabilizing channel is adapted to receive a cutting blade such that said cutting blade extends along at least a portion of said pick;
inserting a distal end of a second cutting instrument into said opening and rotating said distal end of said second cutting instrument, wherein said second cutting instrument comprises:
proximal end forming a handle;
a radiused surface included on said distal end that is adapted to engage the surface of the bone surrounding said opening and to create at least one fracture in the bone; and
a cutting blade disposed opposite of said radiused surface, said cutting blade having a first side, a second side and a top interconnecting said first side and said second side, wherein each of said first side and said second side extend away from said radiused surface;

a first cutting edge defined by said first side and said top, wherein said first cutting edge is adapted to remove at least a portion of the bone surrounding said opening when said cutting blade engages the bone; and, whereby when said distal end is inserted into said opening, a first section of the bone is engaged by said radiused surface while a second section of the bone is simultaneously engaged by said cutting blade so that when said distal end is rotated, said radiused surface creates at least one fracture in the first section of the bone and said first cutting edge removes bone from the second section of the bone; and inserting a dental implant into said opening.

2. The method of claim 1 wherein said force applied to said piercing instrument is a hand force that is applied without the use of an instrument to create any of the force being applied to said piercing instrument.

3. The method of claim 1 wherein said force applied to said first cutting instrument is a hand force that is applied without the use of an instrument to create any of the force being applied to said first cutting instrument.

4. The method of claim 1 wherein the step of applying force to said first cutting instrument to direct said first cutting instrument toward said opening further comprises the step of rocking the cutting blade of the first cutting instrument back and forth to incise the bone surrounding said opening in at least one direction.

5. The method of claim 1 wherein the diameter of said opening is 1 millimeter.

6. The method of claim 5 further comprising the step of applying force to said piercing instrument to enlarge said opening so that it has a diameter of 2 millimeters.

7. The method of claim 1 wherein the step of applying the dental implant into said opening further comprises the step of screwing the implant into the bone by using a hand operated driver.

8. A method of surgically placing a dental implant comprising the steps of:

applying a force to a piercing instrument having a proximal end that includes a handle and a distal end that includes tapered tip so as to cause the tapered tip to create an opening in a bone at a desired location;

applying a force to a first cutting instrument to direct said cutting instrument toward said opening to incise the bone surrounding said opening, wherein said first cutting instrument comprises:

a handle;

an elongated pick carried said handle, wherein said elongated pick tapers and extends in a direction that is parallel to a longitudinal axis of said handle; and, a blade stabilizing channel extending through at least a portion of the length of said pick, wherein said blade stabilizing channel is adapted to receive a cutting blade such that said cutting blade extends along at least a portion of said pick; and inserting a dental implant into said opening.

9. The method of claim 8 wherein said force applied to said piercing instrument is a hand force that is applied without the use of an instrument to create any of the force being applied to said piercing instrument and said hand force causes said piercing instrument to rotate.

10. The method of claim 8 wherein said force applied to said first cutting instrument is a hand force that is applied without the use of an instrument to create any of the force being applied to said first cutting instrument and said hand force causes said first cutting instrument to rock said cutting blade of the first cutting instrument back and forth to incise the bone surrounding said opening in at least one direction.

11. The method of claim 8 wherein the first cutting instrument further comprises:

a blade carrier having a proximal end that is carried by said handle and a distal end that carries said pick, wherein said blade carrier includes a clamping plate that is operable between an engaged position for securing said cutting blade to said blade carrier and a disengaged position for releasing said cutting blade from said blade carrier; and, wherein said blade stabilizing channel is defined by a base, a first side wall and a second side wall and said clamping plate forms at least a portion of said first side wall of said blade stabilizing channel and said clamping plate is adapted to clamp said cutting blade between said clamping plate and said second side wall of said blade stabilizing channel when said clamping plate is in said engaged position.

12. The method of claim 8 wherein the diameter of said opening is one millimeter.

13. The method of claim 12 further comprising the step of applying force to a piercing instrument to enlarge said opening so that said opening has a diameter of 2 millimeters.

14. The method of claim 8 wherein the step of inserting dental implant into said opening further comprises the step of screwing the implant into the bone by using a hand operated driver.

15. The method of claim 8 further comprising the step of:

inserting at least a portion of a second cutting instrument into said opening that has been incised by said first cutting instrument and rotating said distal end of said second cutting instrument, wherein said second cutting instrument comprises:

distal end having a radiused surface that is adapted to engage the surface of the bone surrounding said opening and a cutting blade that is disposed opposite of said radiused surface, said cutting blade having a first side, a second side and a top interconnecting said first side and said second side, wherein each of said first side and said second side extend away from said radiused surface;

cutting edge defined by said first side and said top, wherein said cutting edge is adapted to remove at least a portion of the bone surrounding said opening when said cutting blade engages the bone; and, whereby when said distal end is inserted into said opening, a first section of the bone is engaged by said radiused surface while a second section of the bone is simultaneously engaged by said cutting blade so that when said distal end is rotated, said cutting edge removes bone from the second section of the bone.

16. A method of surgically placing a dental implant comprising the steps of:

applying a force to a first cutting instrument to direct said cutting instrument toward a desired location in a bone to create an opening in the bone, wherein said first cutting instrument comprises:

a handle;

an elongated pick that is carried by said handle and includes a pointed tip adapted to puncture bone; and, a blade stabilizing channel extending through at least a portion of the length of said pick, wherein said blade stabilizing channel is adapted to receive a cutting blade such that when said pointed tip of said elongated pick punctures the bone, said cutting blade incises the bone inserting a distal end of a second cutting instrument into said opening and rotating said distal end of said second cutting instrument, wherein said second cutting instrument comprises:
a radiused surface included on said distal end that is adapted to engage the surface of the bone surrounding said opening and a cutting blade that is disposed opposite of said radiused surface, said cutting blade having a first side, a second side and a top interconnecting said first side and said second side, wherein each of said first side and said second side extend away from said radiused surface;
cutting edge defined by said first side and said top, wherein said cutting edge is adapted to remove at least a portion of the bone surrounding said opening when said cutting blade engages the bone; and,
whereby when said distal end is inserted into said opening, a first section of the bone is engaged by said radiused surface while a second section of the bone is simultaneously engaged by said cutting blade so that when said distal end is rotated, said cutting edge removes bone from the second section of the bone; and
inserting a dental implant into said opening.

17. The method of claim 16 wherein said force applied to said first cutting instrument is a hand force that is applied without the use of an instrument to create any of the force being applied and said hand force causes said first cutting instrument to rock said cutting blade back and forth to create said opening.

18. The method of claim 16 wherein said force applied to said second cutting instrument is a hand force that is applied without the use of an instrument to create any of the force being applied to said second cutting instrument.

19. The method of claim 16 wherein opening created by said first cutting instrument has a diameter of between 1 and 3 millimeters.

20. The method of claim 16 wherein said pick includes a sheath disposed at said pointed tip of said pick so that said sheath is adjacent to said blade stabilizing channel and said sheath receives a tip of said cutting blade when said cutting blade is in said blade stabilizing channel.

* * * * *